(12) United States Patent
Deutschmann et al.

(10) Patent No.: US 11,860,985 B2
(45) Date of Patent: Jan. 2, 2024

(54) ADJUSTING BIOMETRIC DETECTION THRESHOLDS BASED ON RECORDED BEHAVIOR

(71) Applicant: BEHAVIOSEC INC, San Francisco, CA (US)

(72) Inventors: Ingo Deutschmann, Frankleben (DE); Per Burstrom, Lulea (SE)

(73) Assignee: BEHAVIOSEC INC, San Francisco, CA (US)

( * ) Notice: Subject to any disclaimer, the term of this patent is extended or adjusted under 35 U.S.C. 154(b) by 107 days.

(21) Appl. No.: 16/377,463

(22) Filed: Apr. 8, 2019

(65) Prior Publication Data

US 2020/0320181 A1 Oct. 8, 2020

(51) Int. Cl.
| | |
|---|---|
| G06F 21/32 | (2013.01) |
| G06F 21/31 | (2013.01) |
| G06F 21/62 | (2013.01) |
| G06V 40/16 | (2022.01) |
| G06V 40/18 | (2022.01) |
| G06V 40/12 | (2022.01) |

(52) U.S. Cl.
CPC ............ *G06F 21/32* (2013.01); *G06F 21/316* (2013.01); *G06F 21/62* (2013.01); *G06F 2221/2113* (2013.01); *G06V 40/1365* (2022.01); *G06V 40/172* (2022.01); *G06V 40/197* (2022.01)

(58) Field of Classification Search
CPC ........ G06F 21/32; G06F 21/316; G06F 21/62; G06F 2221/2113
See application file for complete search history.

(56) References Cited

U.S. PATENT DOCUMENTS

| | | | |
|---|---|---|---|
| 2007/0143825 A1* | 6/2007 | Goffin | ..................... H04L 63/08 726/2 |
| 2014/0172707 A1* | 6/2014 | Kuntagod | ........ G06Q 20/40145 705/44 |
| 2014/0282868 A1* | 9/2014 | Sheller | ..................... G06F 21/31 726/3 |
| 2014/0341446 A1 | 11/2014 | Hare et al. | |
| 2015/0242605 A1* | 8/2015 | Du | .......................... G06F 21/31 726/7 |
| 2017/0109509 A1* | 4/2017 | Baghdasaryan | ...... G06F 21/316 |
| 2019/0220583 A1* | 7/2019 | Douglas | ................. G06V 40/70 |
| 2019/0362059 A1* | 11/2019 | Xin | ...................... G06V 40/172 |

* cited by examiner

Primary Examiner — Jeffrey D. Popham
(74) Attorney, Agent, or Firm — Troutman Pepper Hamilton Sanders LLP; James E. Schutz; Mark Lehi Jones

(57) ABSTRACT

A user of a device is authenticated after providing a pass code or other data confirming the user can access data on the device. While the user uses the device, behaviometric data is recorded which includes measures of how the user uses the device. Additional data, however, can only be accessed with a biometric and/or second authentication after collecting at least some behaviometric data, in embodiments of the disclosed technology. Depending on how close of a match the behaviometric data received is to previously recorded behaviometric data for the particular user, a threshold minimum is set for the biometric match in order to grant stepped up authentication and authorization to view the additional data. In this manner, a legitimate user often requires less time to authenticate compared to the prior art and a fraudulent user is rejected from access to sensitive data more accurately.

8 Claims, 5 Drawing Sheets

ADJUSTING BIOMETRIC DETECTION THRESHOLDS BASED ON RECORDED BEHAVIOR

FIELD OF THE DISCLOSED TECHNOLOGY

The disclosed technology relates to biometric user authentication and, more specifically to adjusting biometric sensitivity as a function of user behavioral traits.

BACKGROUND OF THE DISCLOSED TECHNOLOGY

U.S. Patent Publication US2014/0341446 describes a product for authenticating a fingerprint by aggregating samples on a digital touch screen including capturing multiple data samples of a finger swipe across the touch screen.

Fingerprint readers and facial recognition for authentication are two widely used biometric modalities in modern devices. Fingerprint reading technology provides very low false accept ratios (FAR), of around 1e-3 to 1e-5, and commonly quite low false reject ratios (FRR) of around 1e-2 to 1e-3. The threshold setting where the FAR and FRR are equal is denoted the Equal Error Rate (EER) point. The lower EER the modality achieves, the better. Facial recognition technology is somewhat less secure than fingerprints and has corresponding numbers of FAR and FRR both around 1e-3. These biometric modalities are usually used as a one-shot procedure for unlocking a device, such as getting into a smartphone or for performing actions that require additional security.

For an authentication system, a main goal is to prevent an impersonator from gaining access to secured data, so a very low FAR rate is wanted by having a very sensitive detector with tight confidence intervals for accepting a sample as genuine or rejecting it as false. However, this means the system also is much more likely to reject a genuine user— low FAR comes with a trade-off of increased FRR. For applications where the user experience is much more important than maximum security, a high false rejection rate can be unacceptable. In a modern smartphone, where unlocking the device can occur hundreds of times a day, the absolute priority of vendors is to provide a smooth user experience (keep the FRR low), at the cost of worse security (high FAR), since if a user does not manage to unlock the phone quickly, they will tend to resort to entering a PIN code or another easier to bypass authentication method. Such authentication methods are usually much less secure than the biometric modalities and make the overall security weaker.

Therefore, there is a need to provide higher accuracy in authenticating a user based on his/her biometrics as well as making the authentication process quicker and more accurate.

SUMMARY OF THE DISCLOSED TECHNOLOGY

Stepped up authentication is achieved by way of a second authentication based on reading biometric data. This is after a first authentication (by behaviometric, biometric, password input, or other authentication mechanisms) and collection of behaviometric data for a user of a device. The first authentication allows access to a first set of data and the stepped up authentication with biometric data input allows access to a second set of data inaccessible prior to the stepped up authentication.

For purposes of this disclosure, the following definitions are used. "Authentication" is the verification of that a user is allowed to access certain data based on receiving an input from or related to the user including any of biometric, behaviometric, and/or inputs to sensors including key presses, passwords, code numbers, and patterns. "Biometric" is data which relates to the biology or physiology of a user including a retinal pattern, fingerprint, or face configuration. "Behaviometric", used interchangeably as an adjective with "behavioral", is data pertaining to a manner of operation of a device as recorded by one or a plurality of sensors in the device or by way of external sensors in other devices. This includes accelerometers, gyroscopes, touch sensors (including touch screens), and processors which measure any or a combination of device angle, key press, position on a screen pressed, swipe speed, swipe intensity (pressure), temperature, and so forth. "Data" is any tangible information which can be or is stored on a physical disk, volatile memory, and/or transferred via a network connection.

Disclosed herein is a method of operating a device to interact with a user, comprising steps of using a first sensor (a device which receives input from the physical world and creates electrical impulses which can be or are converted to data) to receive data about a user (a person or device imitating a person to operate or attempt operation of a device) and granting basic authorization to use the device. "Basic authorization" is defined as authorization to access some data with the device while other data remains inaccessible to the user until a "stepped up" or "second" authentication occurs.

After granting the basic authorization, the user uses the device on which the authorization was granted and the first sensor and/or a second sensor records implicit behavioral inputs by the user. "Implicit" inputs are inputs which vary and change over time in some instances and/or are tied to patterns of use. "Explicit" inputs are those which, under normal circumstances, remain constant or substantially constant over time. "Time" for purposes of the prior definition can be defined as three months, one year, ten years, and/or a lifetime. For example, retinal patterns under normal circumstances (for the majority of people) remain substantially constant through one's entire adult life but for an accident (for a minority of people) whereas an angle of swiping the screen while scrolling (a behaviometric) can change over time and be substantially different even from one act to the next. However, behaviometric inputs often create recognizable patterns.

A request to access data unavailable to the user with the basic authorization is then received and using a sensor (any of those previously described or yet another sensor), explicit biometric input about (from) the user are then received. Based on a combination of the implicit behavior inputs and the explicit biometric input, access to the unavailable data (also referred to as "stepped up authentication") is granted and at least some of the previously unavailable data is sent to the user.

In some embodiments the implicit behavioral inputs and the prior implicit behavioral inputs recorded are unknown to be recorded inputs by the user of the device. Said another way, the user can be unaware that behavioral inputs are being recorded. ("Unknown" and "unaware" are synonymous in the disclosure and is defined as lacking certain information and/or failing to realize a certain fact is true.) That is, the behavioral inputs, or at least some of the behavioral inputs, can be recorded in the background without the knowledge of the user using the device. In some other embodiments the user explicitly has to agree to the recording of his/her behavioral inputs. As behaviorial inputs match that of what is expected, the biometric input required for further access decreases and the time taken to access the previously inaccessible or stepped up authentication required data also decreases in some embodiments of the disclosed technology. This quicker access time due to less of a biometric match requirement can be unknown or unaware to the user in embodiments of the disclosed technology.

The implicit behavioral inputs include, in some embodiments, at least two of keystroke dynamics (how hard and spacing between key presses), mouse movement (position, how fast, acceleration, and/or timing compared to other inputs), swipe pressure, swipe position. The implicit behavioral inputs are compared to, in some embodiments, prior recorded implicit behavioral inputs of the user (those which are associated with the user authenticated during the basic or first authorization) when determining the granting or the denying of (second) access. The implicit behavioral inputs can be compared to the prior recorded implicit behavioral inputs using one or more statistical tests to determine a threshold of closeness between past and present implicit behavioral inputs. "Statistical tests" for purposes of this disclosure are defined as determining a distance of new behavioral samples of a variable (e.g. any/all keys or bigram flight times etc.) to the previously sampled distribution (the learned profile). In some embodiments, this is carried out by comparing the samples to a mean value of an assumed underlying distribution, which can be e.g. Gaussian or log-normal, or computing the Kullback-Leibler divergence which is a measure of the "surprise" or information gain of new samples to an underlying distribution, or if sufficient samples are available, perform a two-sample Kolmogorov-Smirnov or a Cucconi test to determine the similarity. In each of the above methods, a suitable accept/reject threshold (or "critical value") is set.

The threshold of closeness between past and present implicit behavioral inputs determines a minimum required percentage match of the explicit biometric input to grant said access to the unavailable data (the stepped up authentication). The percentage match can be a match of how much of the input has been received (e.g. a ¾ of a fingerprint has been received), how much of the input matches that which is on record already (e.g. ¾ of the received fingerprint scan matches while ¼ does not), and/or closeness of the match based on a statistical determination (e.g. 60% overall match). The percentage match of said explicit biometric input is a portion of a facial, retinal, and/or fingerprint scan depending on the embodiment of the technology. The percentage match can include a partial match from two or more of the facial, the retinal, and/or the finger print scan. Thus, the combination of partial matches can be enough to meet a minimum percentage threshold to grant access.

If an implicit behavioral input changes, a more explicit biometric input for granting access to the unavailable data is required than if the behavioral input remains constant or changes less. In other words, in embodiments of the disclosed technology, the more a behaviorial input or combination of behavioral inputs change, the more of a biometric input, percentage thereof, or closeness of a statistical match between biometric inputs must be achieved in order to grant access to the previously unavailable data (the stepped up authentication).

Described another way, a method for determining a biometric authentication threshold is carried out as follows. An input which grants authorization to access a first set of information stored on a device and/or received via a packet-switched network is received and the first set of information is sent, at least in part, to the user. Here, "information" is synonymous with "data" which is defined above. While the user accesses the first set of information, behaviometric data is monitored (read by sensors) and stored (in memory, on a disk drive, on the device itself, and/or remotely via the packet-switched data network connection). The behaviometric data received is compared to previously stored behaviometric data associated with a particular user (such as the user whose related information was used during the step of granting authorization to access the first set of information).

A threshold of a biometric data match required for stepped-up authentication to access a second set of information is set as a result. This threshold can constantly/continuously change over time, which is defined as changing at least once per minute, once per every 10 seconds, once per second, or as often as a processor in the device or a remote device receives enough data and can process same to update the threshold. The changing threshold is as a function of (direct result of) a determined match or non-match of behaviometric data over time. The greater the match in behaviometric data, the less of a required match in biometric data and vice versa. A biometric input is then received and the user is granted or denied access to the second set of information based on whether the biometric input is below, at, or above the threshold of the biometric data match. That is, based on the threshold set and if the threshold of the biometric data received is at or above such a set threshold, the second information is made available to a user of the device or another device.

Previously stored behaviorial data can be updated with data acquired while monitoring the user and/or user of the device once biometric authentication has taken place. The updating is limited to updating where the biometric match includes a full retina, finger print, or face scan in some embodiments of the disclosed technology.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

A user of a device is authenticated after providing a pass code or other data, e.g. from a biometric authentication modality, confirming the user can access data on the device. While the user uses the device, behaviometric data is recorded which includes measures of how the user uses the device. Additional data, however, can only be accessed with a biometric and/or second authentication after collecting at least some behaviometric data, in embodiments of the disclosed technology. Depending on how close of a match the behaviometric data received is to previously recorded behaviometric data for the particular user, a threshold minimum is set for the biometric match in order to grant stepped up authentication and authorization to view the additional data. In this manner, a legitimate user often requires less time to authenticate compared to the prior art and a fraudulent user is rejected from access to sensitive data more accurately. The more the behaviometrics match, the less the biometric must match in embodiments of the disclosed technology and vice versa. In this manner, a legitimate user requires less time to authenticate and a fraudulent user is rejected from access to sensitive data more accurately.

Embodiments of the disclosed technology will become more clear in view of the following description of the figures.

Figure 1:
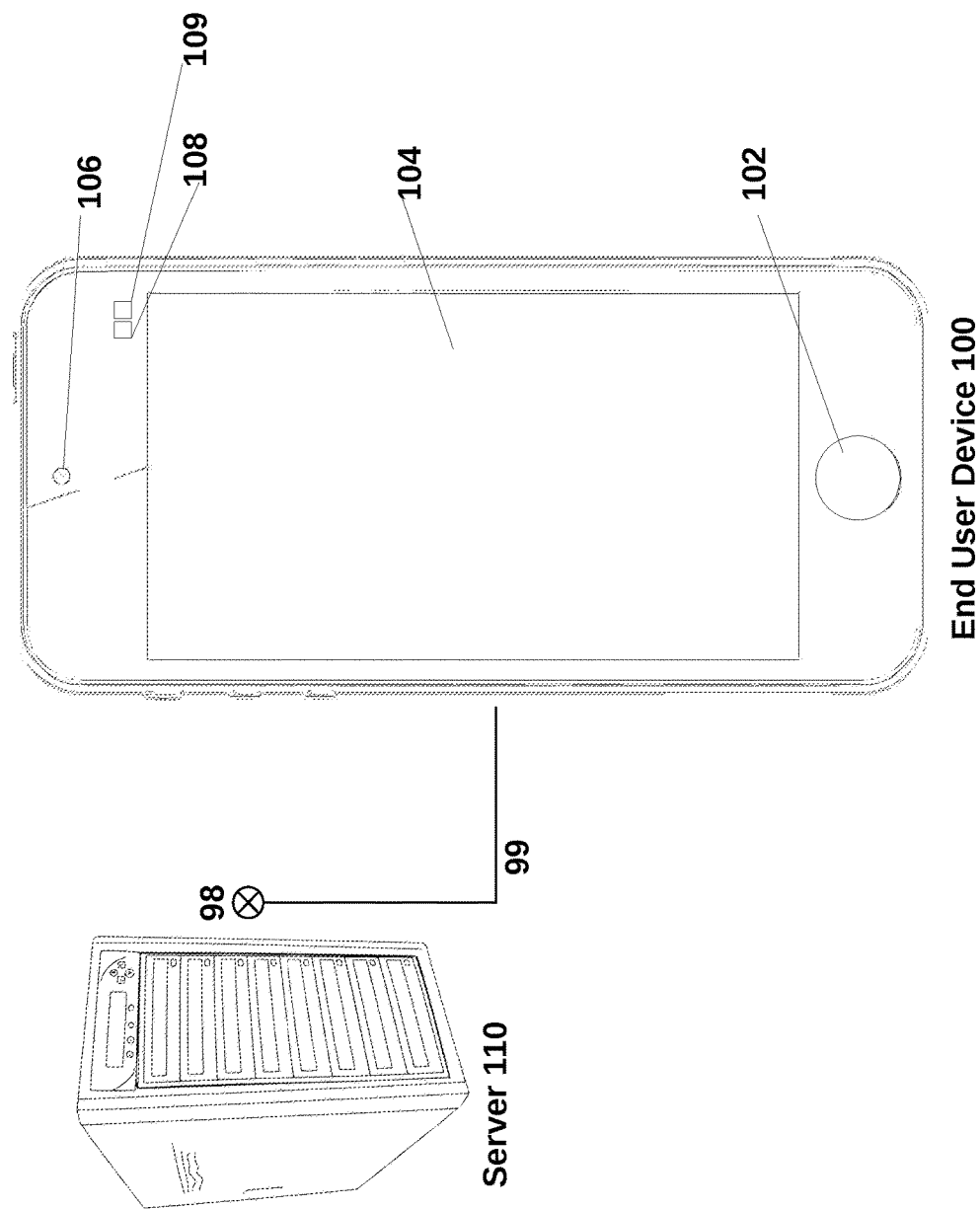
FIG. 1 shows a high level diagram of devices used to carry out embodiments of the disclosed technology.

FIG. 1 shows a high level diagram of devices used to carry out embodiments of the disclosed technology. Here, the server 110 sends content over a packet-switched network 99 by way of a network node 98. The end user device 100 receives this content/data and stores content or retrieves previously stored content using a storage device 108. When the server 110 delivers content to the end user device 100, this can be secure content intended only for an authenticated user of the end user device 100 requiring a basic and/or stepped up authentication. Such data can also be stored on the storage device 108 and retrieved only after authentication.

The end user device 100 has data stored thereon, as described above, or is retrieved from a network, only after a user's identification or a security code is received to confirm the user can access such data and deliver or exhibit such data to the user and/or otherwise make the data available to a user of the device. The authentication can be achieved by hearing the user's voice, receiving an entered password using a touch screen 104, receiving a finger print using a finger print scanner 102, receiving a picture of the user using a camera 106 or the like. Once this basic authorization is received, the user can access the device and the device begins or continues to receive behaviometric data (see definition in the "summary"). The behavioral characteristics of a user include statistical measures of at least one or a plurality of key press times, key flight times, mouse movement, device description, user agent (meaning operating system, browser type, model, and version), screen refresh rate, pressure sensor readings and more. Behaviometric data changes over time in some instances whereas biometric data is more likely to remain constant or substantially constant. The behaviometric data is received using any of, or a combination of, the touch screen 104, and an accelerometer and/or gyroscope 109 which measures direction, angle and/or velocity of the device. The behaviometric data recorded can also vary based on what is displayed on the screen 104. For example, when a keyboard is displayed, inputs (such as presses or swipes) can be seen differently when directed at the keyboard (signifying entry of text) compared to when a swipe is used for example, to move/scroll a window. Each device which receives input is a form of a sensor, for purposes of this disclosure.

Figure 2:
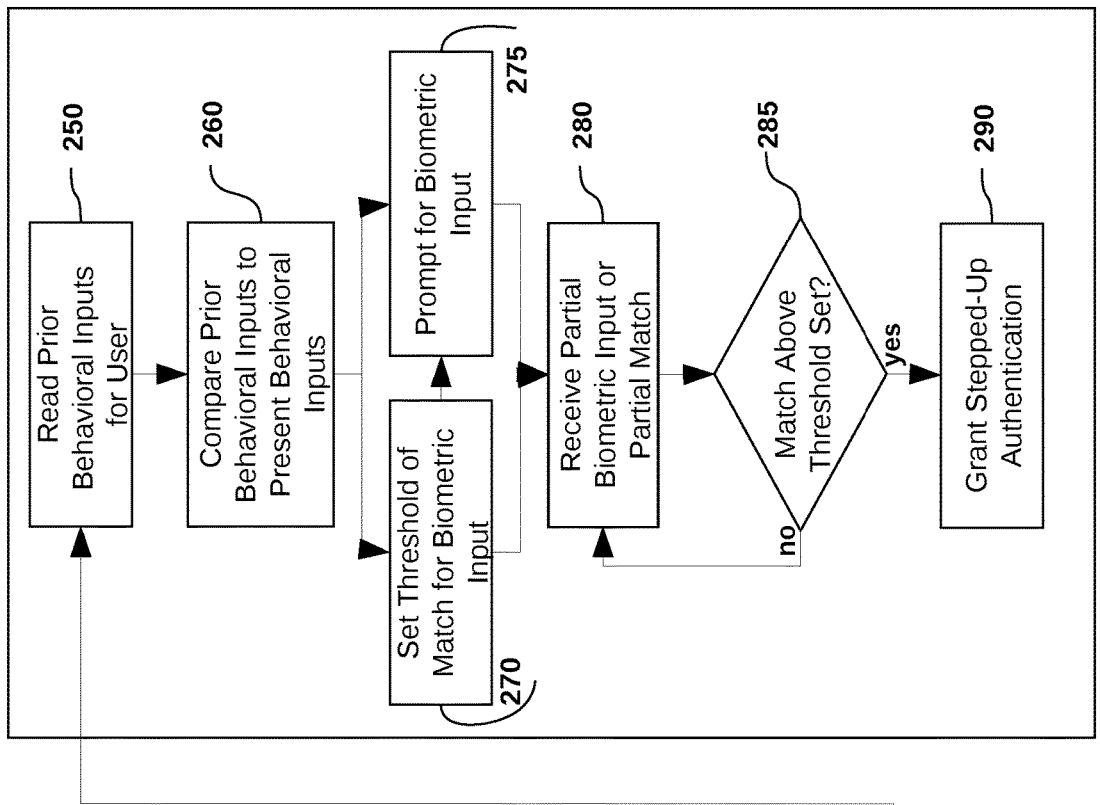
FIG. 2 shows a high level chart of steps carried out in an embodiment of the disclosed technology.
Figure 2:
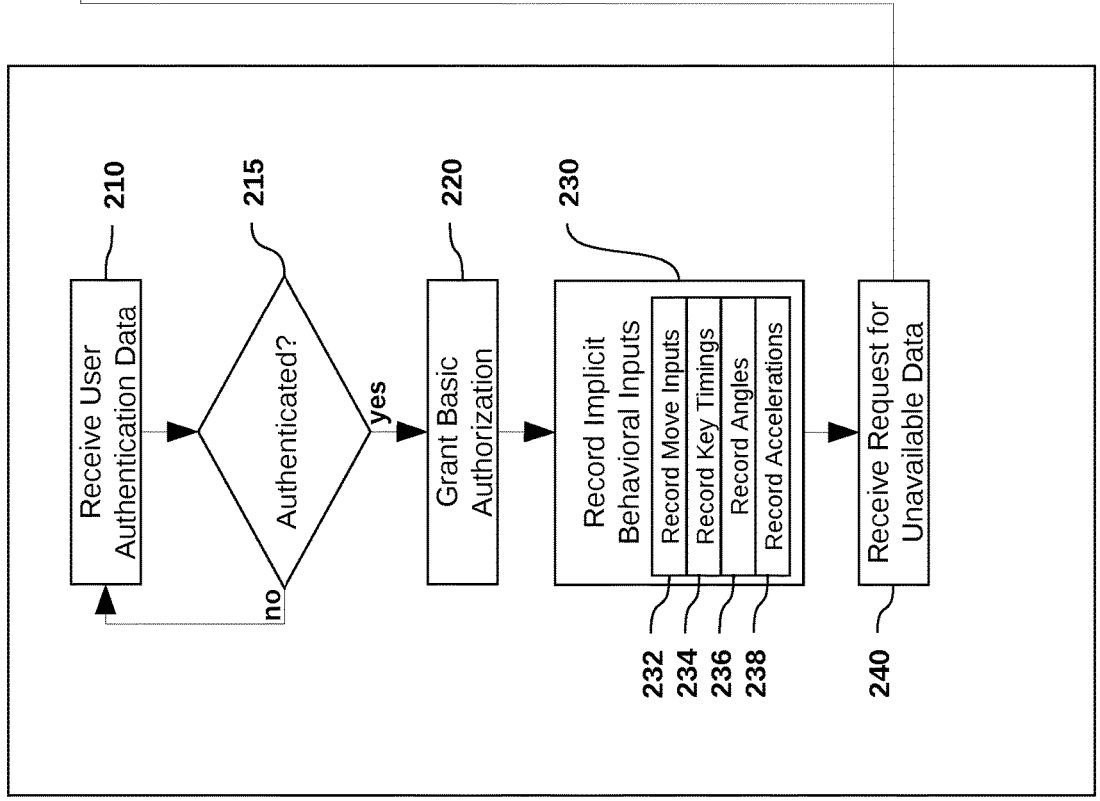

FIG. 2 shows a high level chart of steps carried out in an embodiment of the disclosed technology. A device, such as device 100 shown in FIG. 1, requires authentication to be accessed. In step 210, the user attempts to authenticates him or herself by sending authentication credentials to the device. This can be a biometric input, a password, a series of numbers, a particular swipe pattern or the like. If the user is successful, in step 215, the user is considered to be authenticated and is granted basic authorization to the device in step 220. For this step and purpose, the authentication is simply defined as "received enough security input into the device to allow access to some data which was previously unavailable." Here, "security input" is any necessary input which is used to prevent unmitigated access to the "some data." If the user is unable to provide same, then the user will have to try again and step 210 is carried out again.

Once the user is granted basic authorization in step 220, the user can go about using the device to send/receive information via a touch screen, camera, display, keyboard, mouse, and other inputs or outputs. In some embodiments, all aspects of the device are accessible or are apparently accessible to the user for those software programs, network connections, and inputs/outputs a user expects to have. During this time, however, when the user may be sending email, viewing websites, playing games, and otherwise utilizing his/her device, behaviorial inputs are being recorded in step 230. This can use the devices described with reference to FIG. 1 in addition to a computer mouse, microphone, and/or other inputs. Movement inputs can be recorded in step 232 (e.g. movement of a mouse or the device as a whole), key press timings can be recorded in step 234 (key down, key up, time between certain combinations of keys), angles can be recorded in step 236 (e.g. the angle the device is held while carrying out various tasks/using different software applications), and accelerations can be recorded in step 238 (e.g. how fast and in what direction the device moves/rotates in general and in conjunction with specific software applications and the like).

The behaviorial inputs can be recorded with or without the user being aware of same, depending on the embodiment of the disclosed technology. In some embodiments, the user may be aware of some of the behaviorial recordings, but not know how or what each behaviorial input is recorded. For example, one may know that their behavior is being used to determine that they are the rightful and authenticated user of a device, but they may not know that movement of the device is juxtaposed with a swipe to scroll, where the swipe to scroll is compared in multiple different software applications (defined as "coded instructions which are loaded into distinct and separate areas of memory") which have been determined to have common swipe characteristics. Thus, this sort of behavioral recording and behavioral authentication is therefore part of what is called "unknown" to the user.

In step 240, the user hits a "road block" so to speak. That is, the user requests certain data which is unavailable to the user under the basic authentication granted in step 220. The "unavailable data" is data which requires further authentication beyond the basic authentication, in order to access same. In embodiments of the disclosed technology, the "unavailable data" requires a second authentication and/or a biometric authentication. (See definition of "biometric" in the summary.) The data is then "made available", that is, becomes accessible, by the user. For example, attempting to access information associated with a bank or financial account requires second/stepped up authentication and before granting same, the user is prompted in step 275 to provide such a biometric authentication.

However, before, during, or even after the biometric authentication is received in step 275, a threshold of a match for the biometric input is determined in step 270. That is, depending on the behaviorial inputs gleaned in steps 230 through 238, the "sensitivity" of the biometric match is changed. This "sensitivity" is a percent match or level or degree of biometric match. Such a match can be a percentage of a biometric which matches, a percentage of a biometric which was received, and/or have qualities/lines which each or some match a percentage of what is expected and/or a combination of such indices.

Determining what percentage and/or threshold of biometric match is required (step 270) depends on how close the behaviometric data matched (steps 250 and 260). To determine how close the behaviometric data matched, one reads or retrieves prior stored behaviometric data associated with a particular user (and/or a particular set of authentication credentials which granted basic authentication) in step 250. Then in step 260, the present behavioral characteristics (behaviometrics) gleaned in steps 230 through 238 are compared. This comparison can take place as each new data point is retrieved and/or processed in steps 230 through 238 such that step 270, setting a biometric threshold, changes each time a new behavioral input is received and/or processed. As the behaviometric data match increases, the biometric match required for secondary ("stepped up") authentication decreases in embodiments of the disclosed technology. As the behaviometric data match decreases, the biometric match for secondary authentication increases in embodiments of the disclosed technology. Thus, the threshold can be set and set again continuously (see definition in the "Summary").

Referring still to FIG. 2, in step 275 a prompt for biometric input is requested which includes any indication to a user or a user awareness that biometric input is required or is being received to gain access to data which at the present time is unavailable to the user. In step 280, a biometric data is received from the user into the device (which, for purposes of this disclosure, can include another device which communicates therewith a device provided access). The biometric input can be partial input, such as a partial retinal scan or partial fingerprint or it can be partial in the sense that it includes data which partially matches that which is expected or known to be associated with a particular user. The steps 280 and 285 of receiving and matching of partial or full biometric input are further explained in the text describing FIG. 5. It is then determined in step 285 if the biometric data received in step 280 is below, at, or above a threshold requirement for authentication as set in step 270. If not, step 280 must be carried out again and stepped up authentication and data which is only available after receiving same is withheld or continues to be withheld from the user. If so, and the biometric match received is above the present threshold required, then the stepped up authentication is granted in step 290 and the user is given access to data which is available only with the stepped up authentication.

Upon receiving the stepped up authentication, the behaviometric data gleaned in steps 230 through 238, in some embodiments, is stored with the user profile and used to carry out further embodiments of the disclosed technology such as in future user interactions with the device to verify that the user is the same as a prior user based on behaviometric data received. In some embodiments, only if the biometric data received is a full biometric image or substantially full biometric image (or equivalent of an image) is the user behaviometric data updated.

An advantage to the described method steps in FIG. 2 is that stepped up (second) authentication can occur faster for a legitimate user compared to a different second or illegitimate user. For example, suppose the behaviometric match is above 90%. In such a case, the biometric match required might be 10%. One can just barely (e.g. 10% of what a full fingerprint scan would require) touch their finger to a fingerprint sensor and receive the secondary authentication very quickly or have the processing thereof be finish quicker compared to when the behaviometric match were lower. Conversely, suppose the behaviometric data does not match well. There may be a 20% behaviometric match for whatever reason, such as another person using the device. In such a case, in order to avoid a false positive biometric match, the threshold of biometric match might be set at 90% which will prevent a person from using a photocopy or wax copy of a fingerprint or the like. In this manner, fraudulent users are penalized while the user experience for an authentic user is improved in this system.

Figure 3:
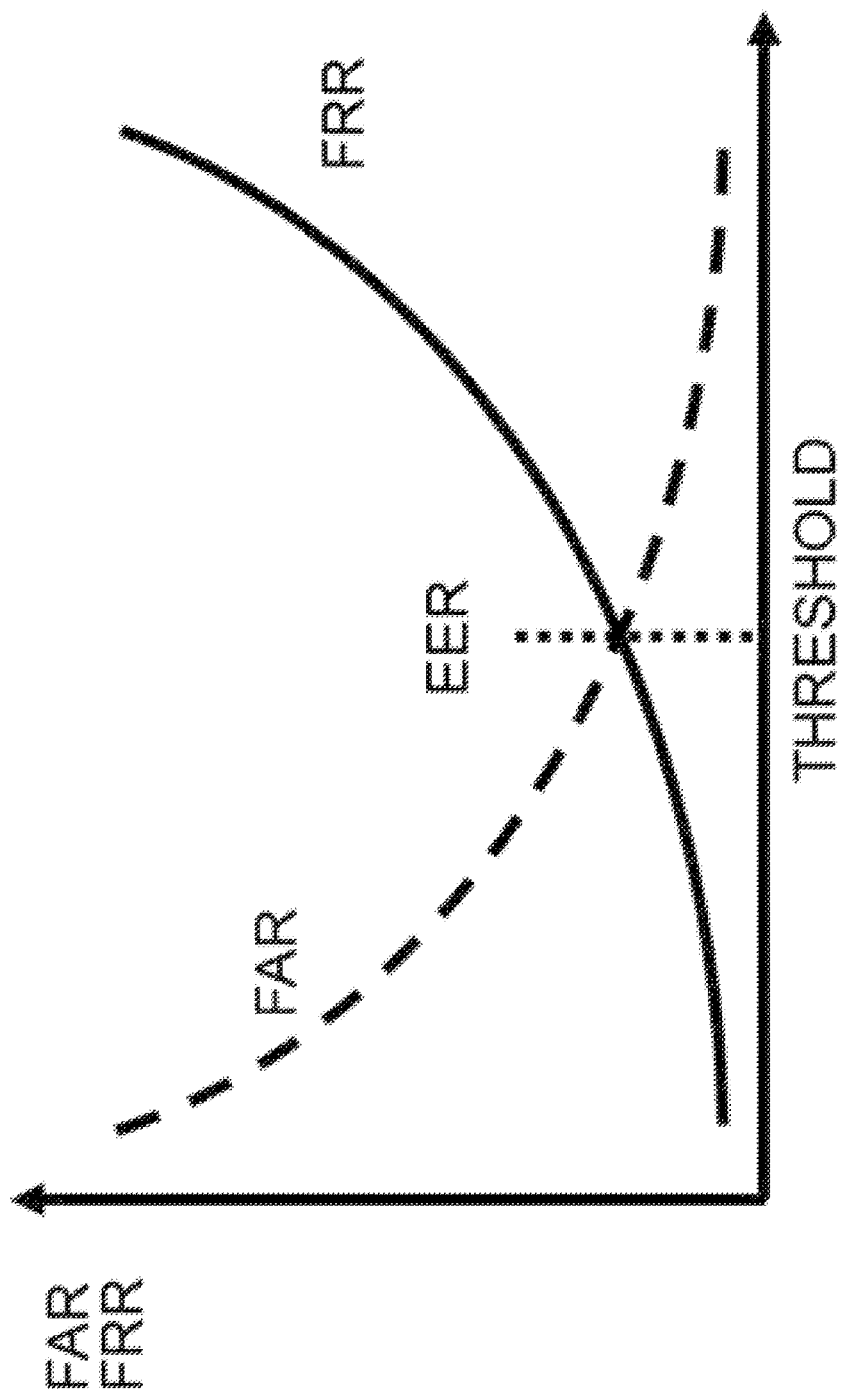
FIG. 3 shows a graph of false accept ratios versus false reject ratios to help illustrate aspects of the disclosed technology.

FIG. 3 shows a graph of false accept ratios versus false reject ratios to help illustrate aspects of the disclosed technology. On the X-axis is the threshold of a match in biometric and/or behaviometric data. The Y-axis represents a percentage match from 0% to 100%. As one requires higher and higher thresholds of a match (the solid parabolic line), the false rejection rate (FRR) increases. However, inversely, the false acceptance rate FAR; the dotted line) decreases. The same is true in the opposite direction. As the false acceptance rate increases, the false rejection rate decreases. Somewhere in the middle there is an equal acceptance/rejection rate (EER). In embodiments of the disclosed technology, over time the behaviometric match is determined with greater and greater precision and/or will help determine if another person has started using the device when the behaviometric matching drops off precipitously. The biometric match threshold is set as a result of the behaviometric match.

Thus, one can look at the graph another way. When the behaviometric match is low (dotted line, towards the right) then the biometric match requirement will be high (solid line, towards the right). This is because in such a case, the concern of a false acceptance is high but the concern of a false rejection is low so we would rather produce a false rejection than a false acceptance because there is a low level of trust of the user. However, when the behaviometric match is high (dotted line, towards the left) then the biometric match threshold is set low (solid line, towards the left) because we have less concern over a false acceptance and so forth.

Figure 4:
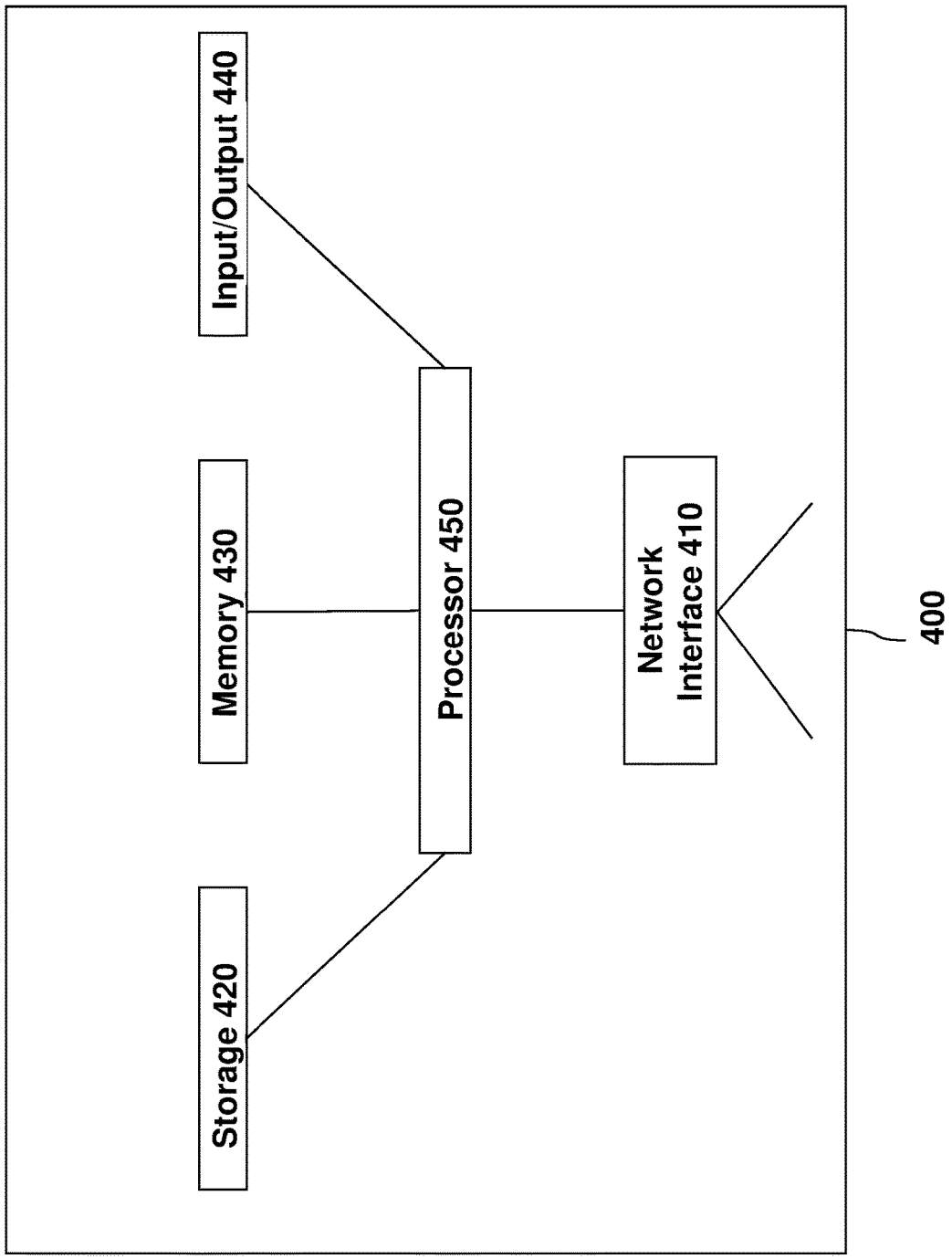
FIG. 4 shows a high level block diagram of devices used to carry out embodiments of the disclosed technology.

FIG. 4 shows a high level block diagram of devices used to carry out embodiments of the disclosed technology. Device 400 comprises a processor 450 that controls the overall operation of the computer by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions. A device 400 also includes one or a plurality of input network interfaces for communicating with other devices via a network (e.g., the internet). The device 400 further includes an electrical input interface. A device 400 also includes one or more output network interfaces 410 for communicating with other devices. Device 400 also includes input/output 440 representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device for illustrative purposes. It should also be understood by one skilled in the art that the method and devices depicted in FIGS. 1 through 3 may be implemented on a device such as is shown in FIG. 4.

Figure 5:
FIG. 5 shows an example of a fingerprint scan used with embodiments of the disclosed technology.

FIG. 5 is an example fingerprint and an enlargement of a part of the fingerprint which can be used in conjunction with some embodiments of the disclosed technology. It is important to note that the figure shown is a precise vector-based and noise-free image for example purposes, while actual data received by fingerprint sensors can and often does lack such clarity. Most modern automatic fingerprint recognition algorithms are based on matching local ridge patterns of the fingers, known as minutiae. The minutiae features are extracted and stored in templates which allow much faster and more robust matching to an incoming sample than searching the full image. However, the extraction and matching of the minutiae can still be very sensitive to dirt, moist, scars, dented skin, or non-uniform contact of the finger with the sensing surface.

In real-world use, the fingerprint reading sensor is also typically much smaller than a full fingertip and only captures a part of the full pattern. Electronic devices which use fingerprint readers to grant access are typically trained on their users' fingerprints 500 by capturing multiple images shown in inset 510, including images of parts of the finger 512, 514, and/or 516 during consecutive touches of the sensor, to allow for covering a larger area and having more minutiae forming the biometric profile. Furthermore, especially in subsequent daily use following the setup period, the captured images are noisy and need preprocessing/cleaning before they can be matched. The resulting determining of the degree of matching a sample to the stored database is commonly achieving a less than perfect accuracy, and the threshold of step 285 for biometric matching is then in the case of a fingerprint modality precisely related to how much the minutiae need to match. The exact method of how this is done can be proprietary information for each vendor, but in general, in order to provide a match to ensure the correct user is discovered, the fingerprint reader's algorithms may employ rules of which and how many minutiae need to be detected (e.g. just an image enough to show the fingerprint in box 514), in what specific patterns and in relation to each other they need to be in (e.g. boxes 512, 415, and 516 in the relative positions of each box), and having individual signal to noise ratio requirements for each minutiae to determine the minutiae-individual matching.

Certain minutiae are also more rarely occurring than others, such that a match of some patterns may be achieved by identifying only a very low number of minutiae. For the above reasons, a partial match of a fingerprint sample may arise in many different ways, and setting the threshold required for matching can in practice mean different things. It is therefore to be understood by those skilled in the art that the invention is not limited to setting a single threshold value based on a behavioral input but might involve a more general notion of biometric modalities using a behavioral input as a value to modify multiple detection thresholds, or even to change algorithms used for biometric detection. Techniques for identifying iris patterns and facial recognition use similar subsets of the full biometric scan to perform pattern matching.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

What is claimed is:

1. A method for determining a biometric authentication threshold for a user, comprising:
   at a computing device, receiving a first biometric input, and based on the received first biometric input granting a first level of authorization to the user to access a first set of information stored on a device and/or received via a packet-switched network;
   while the user accesses the first set of information, using at least one sensor, collecting behavioral data associated with accessing the first set of information;
   transferring the collected behavioral data to the computing device;
   at the computing device, monitoring and storing the behavioral data;
   comparing the behavioral data to previously stored behavioral data associated with a particular user associated with the first level of authorization;
   based on the comparing, computing a behavioral threshold of closeness between the behavioral data and the previously stored behavioral data;
   based on the behavioral threshold of closeness, determining an initial biometric threshold percentage of a biometric data match required for step-up authentication for the user to access a second set of information, the second set of information including the first set of information and additional information not included in the first set of information, the initial biometric threshold percentage having a value greater than 0 and smaller than 100; and
   at the computing device, receiving from a biometric sensor, second biometric data relating to a second biometric input;
   computing, based on comparing the second biometric input to the first biometric input, a biometric match percentage between the second biometric input and the first biometric input;
   computing an updated biometric threshold percentage based on reducing the initial biometric threshold in proportion to the biometric match percentage; and
   granting access to the second set of information based on the biometric match percentage being at, or above the updated biometric threshold percentage.

2. The method of claim 1, wherein the comparing is based on a Gaussian distribution.

3. The method of claim 1, wherein the computing the updated biometric threshold percentage comprises continuously changing the initial biometric threshold percentage as a function of currently received behavioral data matching or non-matching the previously stored behavioral data.

4. The method of claim 3, wherein the computing the updated biometric threshold percentage comprises lowering the updated biometric threshold percentage as a result of the currently received behavioral data matching the previously stored behavioral data.

5. The method of claim 4, further comprising lowering a time taken for the step-up authentication in response to the lowering the updated biometric threshold percentage.

6. The method of claim 1, wherein the behavioral data changes over time and the first biometric input and second biometric input remains substantially identical over time.

7. The method of claim 6, further comprising, in response to successful the step-up authentication, updating of the previously stored behavioral data with the behavioral data acquired during the monitoring.

8. The method of claim 7, wherein the first biometric input and the second biometric input includes a full retina, fingerprint, or face scan.

* * * * *